US011742723B2

(12) United States Patent
Humphries et al.

(10) Patent No.: US 11,742,723 B2
(45) Date of Patent: Aug. 29, 2023

(54) WEDGE TIGHTNESS MONITORING

(71) Applicant: Siemens Energy, Inc., Orlando, FL (US)

(72) Inventors: Benjamin Todd Humphries, Orlando, FL (US); Jon Bell, Orlando, FL (US); Evangelos V. Diatzikis, Oviedo, FL (US)

(73) Assignee: SIEMENS ENERGY, INC., Orlando, FL (US)

( * ) Notice: Subject to any disclaimer, the term of this patent is extended or adjusted under 35 U.S.C. 154(b) by 0 days.

(21) Appl. No.: 17/672,240

(22) Filed: Feb. 15, 2022

(65) Prior Publication Data
US 2022/0263386 A1 Aug. 18, 2022

Related U.S. Application Data

(60) Provisional application No. 63/149,922, filed on Feb. 16, 2021.

(51) Int. Cl.
*H02K 11/20* (2016.01)
*H02K 3/487* (2006.01)
*G01B 11/16* (2006.01)

(52) U.S. Cl.
CPC .............. *H02K 11/20* (2016.01); *G01B 11/16* (2013.01); *H02K 3/487* (2013.01)

(58) Field of Classification Search
CPC .......... G01B 11/16; H02K 3/48; H02K 3/487; H02K 11/00; H02K 11/20

USPC ....................... 310/66, 67 R, 68 C
See application file for complete search history.

(56) References Cited

U.S. PATENT DOCUMENTS

| | | | | |
|---|---|---|---|---|
| 2008/0036336 A1* | 2/2008 | Salem | ................ | H02K 11/22 310/68 B |
| 2010/0066315 A1* | 3/2010 | Diatzikis | ................ | H02K 11/20 322/99 |
| 2012/0049697 A1* | 3/2012 | Andarawis | ............ | G01L 5/0057 310/68 B |
| 2014/0306574 A1* | 10/2014 | Twerdochlib | .......... | H02K 11/20 173/2 |
| 2021/0257539 A1* | 8/2021 | Okulan | ................ | H10N 30/872 |
| 2022/0276045 A1* | 9/2022 | Hana | ....................... | H02K 15/00 |
| 2022/0360127 A1* | 11/2022 | Kometani | ............. | H02K 17/205 |

FOREIGN PATENT DOCUMENTS

JP 59165942 A * 9/1984 ............. H02K 11/20

OTHER PUBLICATIONS

Seichi et al., English Machine Translation of JP 59165942 (Year: 1984).*

* cited by examiner

*Primary Examiner* — Rashad H Johnson
(74) *Attorney, Agent, or Firm* — Janet Diane Hood

(57) ABSTRACT

A generator slot wedge is described. The slot wedge includes a surface and further includes a strain gage. The strain gage is attached to the surface of the slot wedge. A method of determining the strain on the generator slot wedge of the generator via the strain gage is also described.

10 Claims, 5 Drawing Sheets

WEDGE TIGHTNESS MONITORING

BACKGROUND

Electric generators, and in particular three-phase synchronous generators are often used on power generation activities to generate grid-suitable electricity using a prime mover such as a gas turbine, steam turbine, wind turbine, hydro turbine, and the like. The generators generally include a stator that remains stationary during operation and a rotor that rotates with respect to the stator. The rotor often includes two or more poles that when rotated interact with the stator to generate the desired current at the desired frequency and voltage.

BRIEF DESCRIPTION OF THE DRAWINGS

To easily identify the discussion of any particular element or act, the most significant digit or digits in a reference number refer to the figure number in which that element is first introduced.

DETAILED DESCRIPTION

Figure 1:
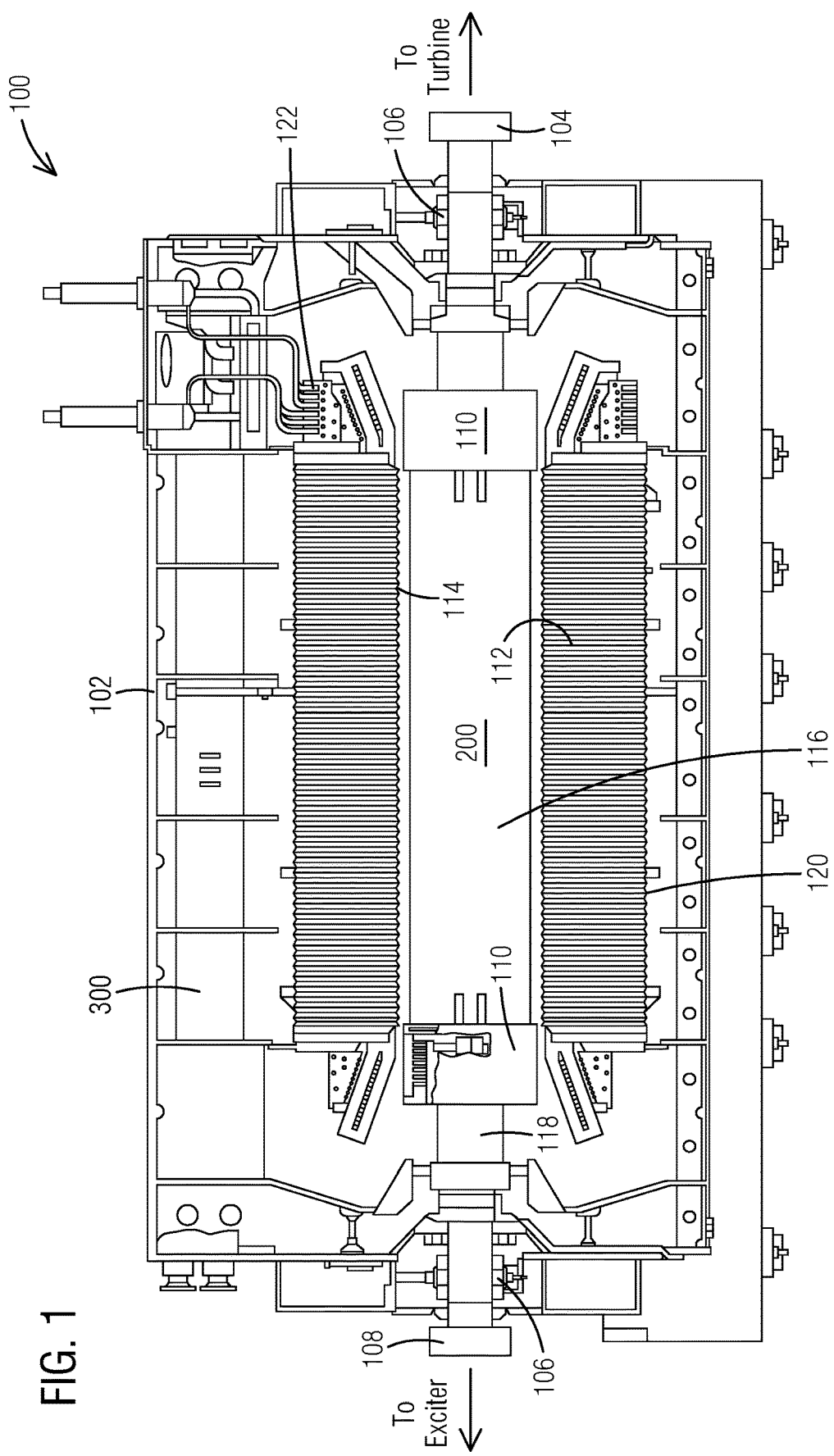
FIG. 1 is a cross-sectional view of a generator taken along the generator centerline, rotational, or longitudinal axis.

Before any embodiments of the invention are explained in detail, it is to be understood that the invention is not limited in its application to the details of construction and the arrangement of components set forth in this description or illustrated in the following drawings. The invention is capable of other embodiments and of being practiced or of being carried out in various ways. Also, it is to be understood that the phraseology and terminology used herein is for the purpose of description and should not be regarded as limiting.

Various technologies that pertain to systems and methods will now be described with reference to the drawings, where like reference numerals represent like elements throughout. The drawings discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged apparatus. It is to be understood that functionality that is described as being carried out by certain system elements may be performed by multiple elements. Similarly, for instance, an element may be configured to perform functionality that is described as being carried out by multiple elements. The numerous innovative teachings of the present application will be described with reference to exemplary non-limiting embodiments.

Also, it should be understood that the words or phrases used herein should be construed broadly, unless expressly limited in some examples. For example, the terms "including," "having," and "comprising," as well as derivatives thereof, mean inclusion without limitation. The singular forms "a", "an" and "the" are intended to include the plural forms as well, unless the context clearly indicates otherwise. Further, the term "and/or" as used herein refers to and encompasses any and all possible combinations of one or more of the associated listed items. The term "or" is inclusive, meaning and/or, unless the context clearly indicates otherwise. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. Furthermore, while multiple embodiments or constructions may be described herein, any features, methods, steps, components, etc. described with regard to one embodiment are equally applicable to other embodiments absent a specific statement to the contrary.

Also, although the terms "first", "second", "third" and so forth may be used herein to refer to various elements, information, functions, or acts, these elements, information, functions, or acts should not be limited by these terms. Rather these numeral adjectives are used to distinguish different elements, information, functions or acts from each other. For example, a first element, information, function, or act could be termed a second element, information, function, or act, and, similarly, a second element, information, function, or act could be termed a first element, information, function, or act, without departing from the scope of the present disclosure.

In addition, the term "adjacent to" may mean that an element is relatively near to but not in contact with a further element or that the element is in contact with the further portion, unless the context clearly indicates otherwise. Further, the phrase "based on" is intended to mean "based, at least in part, on" unless explicitly stated otherwise. Terms "about" or "substantially" or like terms are intended to cover variations in a value that are within normal industry manufacturing tolerances for that dimension. If no industry standard is available, a variation of twenty percent would fall within the meaning of these terms unless otherwise stated.

As illustrated in FIG. 1, a generator 100 includes a stator 300 and a rotor 200 supported for rotation within the stator 300. The stator 300 includes a stator housing 102 that surrounds and substantially encloses a stator core 120 The stator core 120 is often made-up of a number of laminations 112 stacked in a longitudinal direction (along a rotational axis). Each lamination 112 includes cut outs or is otherwise shaped to include a bore 114 that is sized to receive the rotor 200.

In some constructions, stator cooling system 122 is provided to cool the stator 300 and improve the efficiency and power density of the stator 300. In some constructions, a cooling gas is employed as a stator coolant. However, larger stators 300 may include liquid cooling such as water cooling.

The rotor 200 includes a rotor core 116, a rotor shaft 118, and two retaining rings 110 coupled to the rotor shaft 118. The illustrated rotor shaft 118 is supported for rotation by a bearing 106 positioned at each end of the rotor 200. A turbine coupling 104 is positioned at one end of the rotor 200 to facilitate connection of the rotor 200 to a turbine (e.g., combustion turbine, steam turbine, hydro turbine, wind turbine, etc.) or to another prime mover. The opposite end of the rotor 200 may include an exciter coupling 108 that allows for connection to an exciter or other rotating equipment.

The generator 100 illustrated in FIG. 1 is a synchronous generator 100. However, asynchronous generators or motors could include the features described herein.

Figure 2:
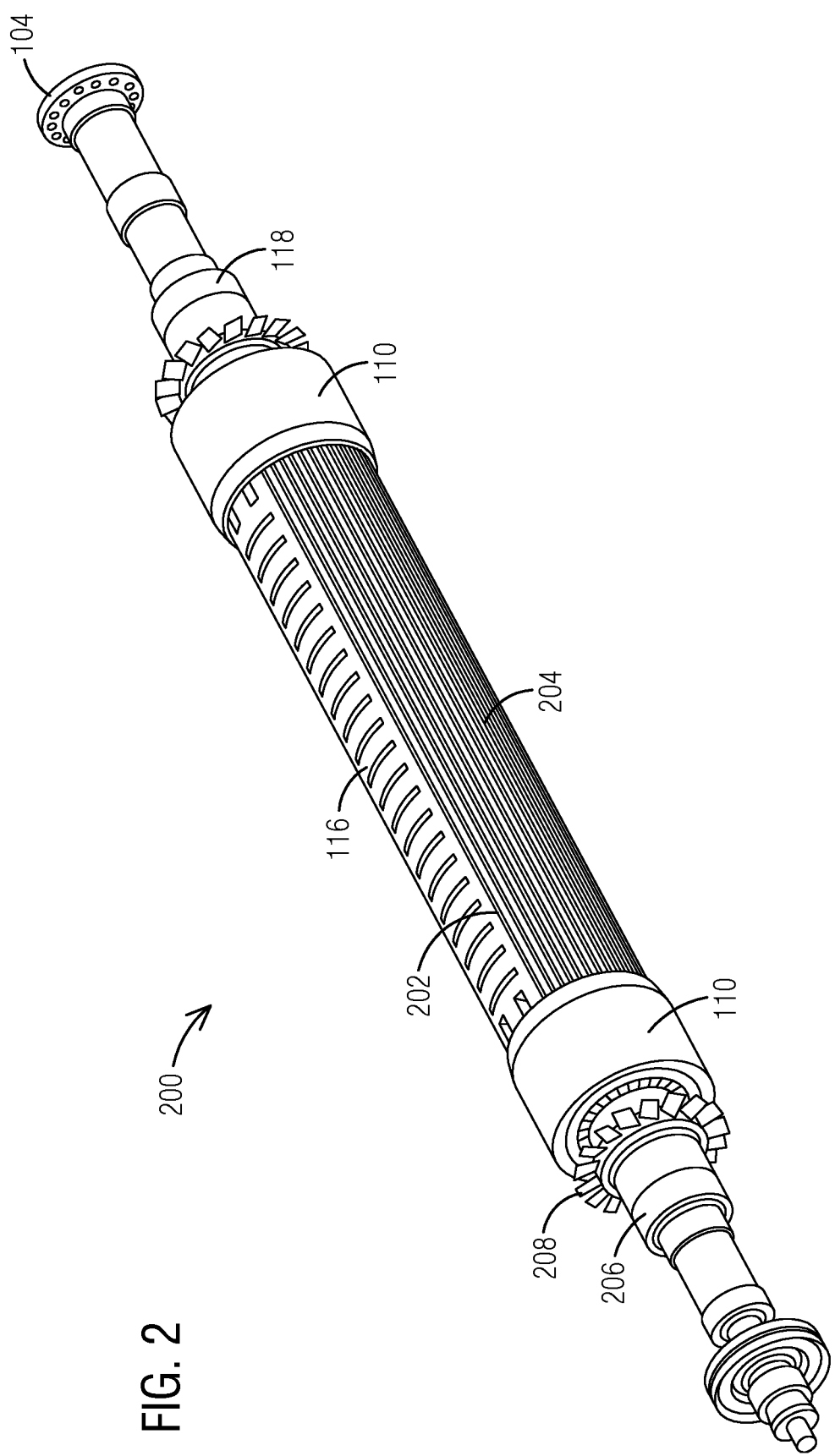
FIG. 2 is a perspective view of a rotor suitable for use in the generator of FIG. 1.

FIG. 2 illustrates the rotor 200 of FIG. 1 in greater detail. The rotor core 116 includes a series of rotor slots 202 that extend longitudinally along the rotor core 116. Rotor windings 204 are positioned within the rotor slots 202 to define one or more pairs of poles. In the illustrated construction two poles are formed by the rotor windings 204. However, other constructions could include four poles, eight poles or more poles if desired. The rotor 200, sometimes referred to as a field, may also include a commutator 206 that provides a connection to an exciter that provides electrical current at a desired voltage to the windings 306 to generate a magnetic field.

The rotor 200 may also include a rotor cooling system 208 that operates to cool the rotor 200. In some constructions, the rotor 200 is air-cooled with other constructions employing another fluid such as hydrogen.

Figure 3A:
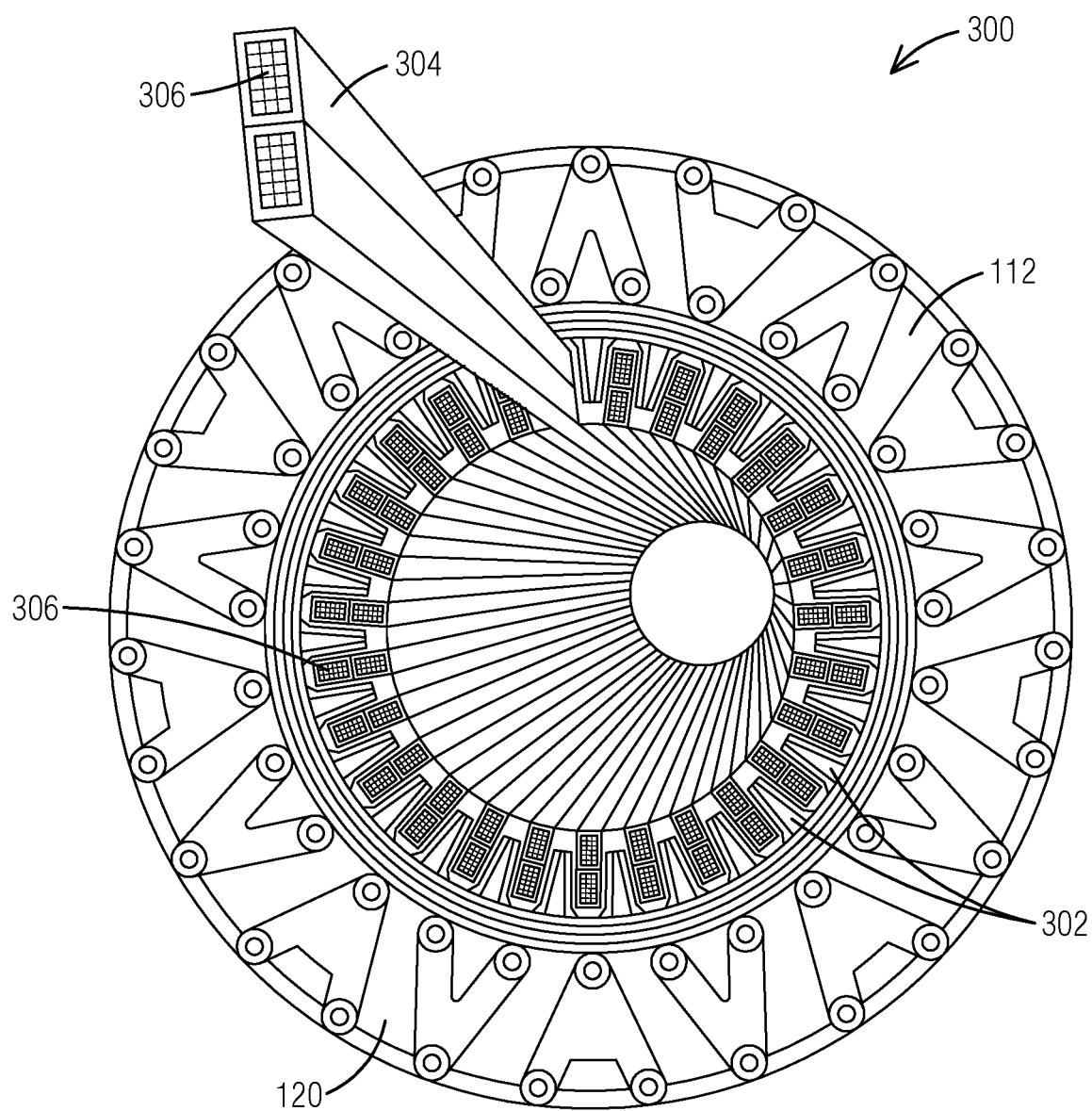
FIG. 3A is a perspective view of a portion of a stator suitable for use in the generator of FIG. 1.

Turning to FIG. 3A, the stator 300 is illustrated in greater detail. The stator core 120, in most constructions is formed from a series of laminations 112 that are stacked in the longitudinal direction. Each lamination 112 includes cut-outs, openings or features that when stacked define the desired features of the stator core 120. Each of the laminations 112 includes a number of teeth 302 that are evenly spaced circumferentially around the bore 114. The teeth 302 cooperate to define a series of slots that extend the length of the stator core 120. Bars 304 are positioned within the slots and are electrically connected to one another to define a series of windings 306. In the illustrated generator 100, the windings 306 are arranged to define three phases. Generally, the three phases are electrically arranged to define a delta-circuit or a Y-circuit as may be desired. Of course, other constructions could include a single phase if desired.

As part of the slot wedge 400, each of the bars 304 includes one or more coolant passages that allow for the flow of coolant along the length of the bar 304. As discussed, a coolant fluid such as water is often employed to cool the generator.

Figure 3B:
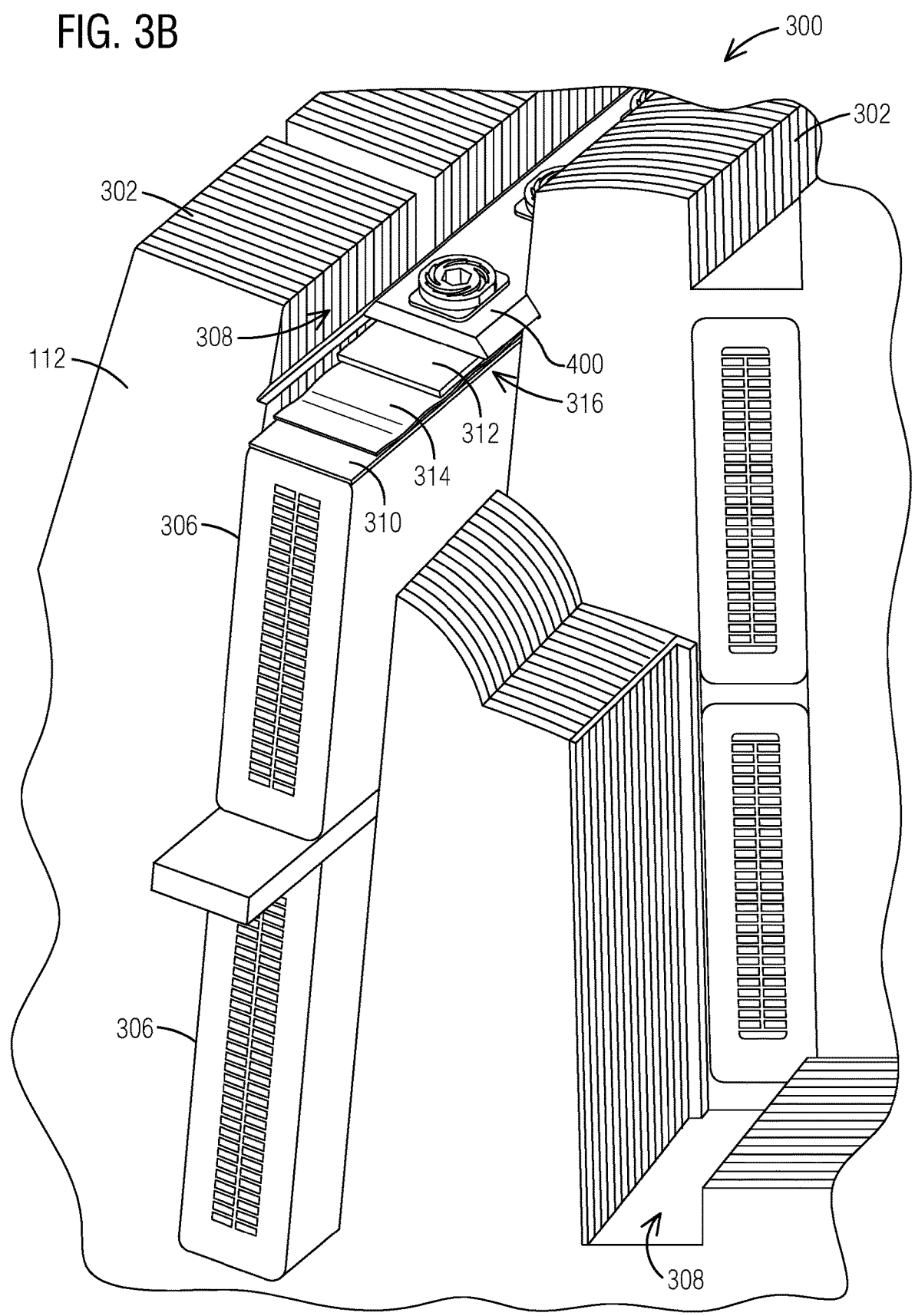
FIG. 3B is a further perspective view of a portion of the stator suitable for use in the generator of FIG. 1.

Referring to FIG. 3B, the stator 300 is described in more detail. The stator 300 includes stator slots 308 formed between adjacent teeth 302 of the laminations 112. A plurality of windings 308 are arranged in within the stator slot 308 along with a wedge system 316.

The wedge system 316 comprises a slot wedge 400 and spring member 314. The spring member 314 provides a continuous radial load onto the winding 306. The spring member 314 may be a ripple spring or a pre-stressed driving strip (PSDS). Other layers such a first filer layer 310 and/or a second filer layers 312 may be used as fill. For example, a first filer layer 310 may be arranged between the windings 306 and the spring member 314. A second filer layers 312 may be arranged between the spring member 314 and the stator housing 102.

Figure 4:
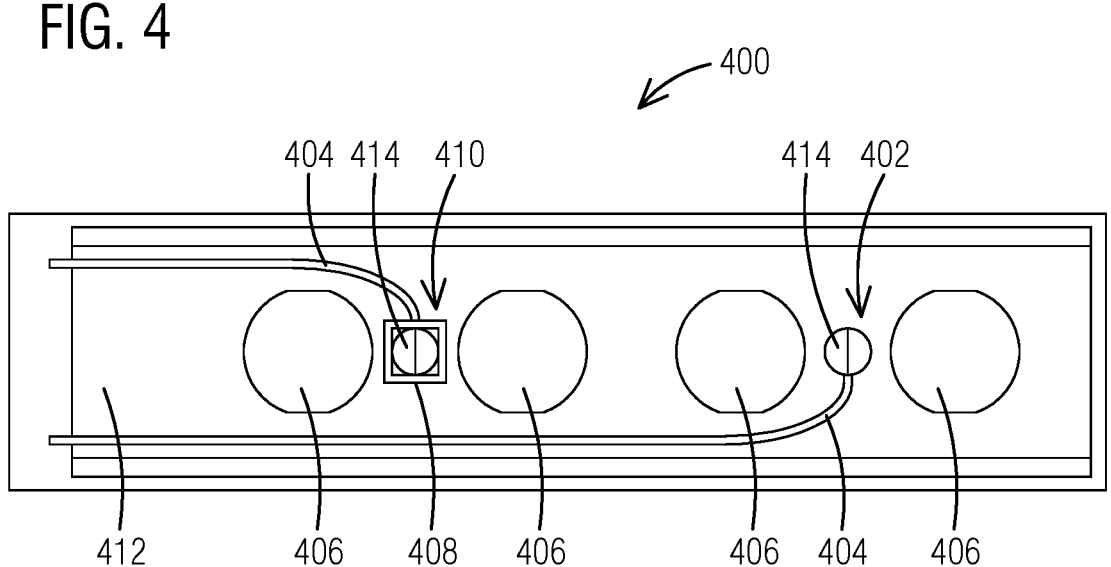
FIG. 4 illustrates a slot wedge in accordance with one embodiment.

Now turning to FIG. 4, the slot wedge 400 is described in more detail. The slot wedge 400 includes a strain gage 402 arranged thereon. The strain gage 402 includes a sensor 414 connected to a lead 404. The strain gage 402 may be mounted to a surface 412 of the slot wedge 400 by a non conductive material such as room temperature vulcanizing silicone (RTV).

The slot wedge 400 may include apertures 406 through which tightening members are inserted when securing the slot wedge 400. The sensor 414 is arranged on the slot wedge 400 to measure a bending of the slot wedge 400. The strain gage 402 may be arranged between adjacent apertures 406.

The slot wedge 400 may include a temperature compensation strain gage 410 comprising a sensor 414, a lead 404, and a damper 408. The lead 404 is connected to the sensor 414 and the sensor is connected to the damper 408 that is arranged on the slot wedge 400. The damper 408 reduces the sensitivity of the temperature compensation strain gage 410 to the bending of the slot wedge 400. Thereby, the strain on the sensor 414 of the temperature compensation strain gage 410 substantially measures the bending due to a temperature change over the strain due to the loosing of the slot wedge 400. The damper 408 may be a material such a cotton phenolic or RTV.

The illustrated strain gage 402 and temperature compensation strain gage 410 are each an optical strain gage. However, other types of strain gages, such as copper mesh strain gage may be used. It would be understood that a strain gage 402 including conductive material may comprise a shielding to avoid electrical noise in the generator 100.

While the illustrated slot wedge 400 includes a single strain gage 402, a plurality of strain gages 402 may be arranged on the slot wedge 400.

Figure 5:
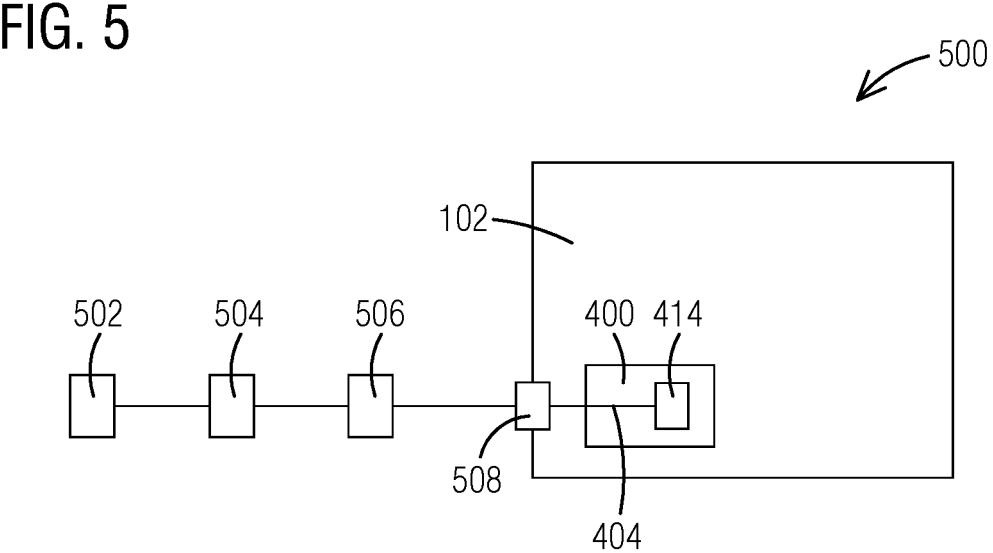
FIG. 5 illustrates a generator system of the subject matter in accordance using the slot wedge of FIG. 4.

Referring to the wedge tightness monitoring system 500 illustrated in FIG. 5, A slot wedge 400 includes a sensor 414 and lead 404. The lead 404 exits the housing and is connected to a coupler 506. The coupler 506 being outside of the housing allows and analysis of the measurement of the strain gage 402 and/or temperature compensation strain gage 410 during operation.

The coupler 506 is fed into an analyzer 504 that is further connected to a computer 502 so that the analysis may take place in the computer 502. The illustrated configuration is merely one embodiment. Other connectors and/or components may be employed in order to facilitate the monitoring.

A pressure seal 508 may be provided in the stator housing 102 wherein the lead 404 exits the stator housing 102 through the pressure seal 508.

In operation, an exciter or other system provides current at a desired voltage to the rotor 200. The current flows through the rotor windings 204 to establish two magnetic poles in a two pole generator and more poles in higher pole generators. The turbine, or other prime mover is coupled to the rotor 200 and operates to rotate the rotor 200 at a desired speed. For a synchronous generator with a two pole rotor 200, the rotor is rotated at 3600 RPM to generate 60 Hz electricity. For electricity at 50 Hz, the rotor 200 is rotated at 3000 RPM.

The windings 306 are secured within the stator slot 308 by the slot wedge 400. The spring member 314 provides a continuous radial load onto the winding 306. The slot wedge 400 is kept under tension to prevent wear of the windings 306 due to vibration during operation. Over time, a loss of radial loading on the winding 306 may occur. Once the tension is reduced below threshold, the winding 306 may move and become damaged and to prevent such damaged the stator slot 308 is rewedged. In order to determine the tightness of the stator housing 102, a test, such as a tap test, is performed while the generator 100 is down. Improvements to detect the tension on the slot wedge 400 are desired.

The strain sensor provides for monitoring the stain of the slot wedge 400 during operation. Over time the tension of the stator housing 102 is reduced changing the bend in the slot wedge 400. The strain on the slot wedge 400 is reduced as the slot wedge 400 unloads over time. The strain gage 402 measures the strain on the wedge during operation and provides the measurement sensed by strain sensor 414 over the lead 404 which is fed through the stator housing 102 in order for the measurement to be further analyzed. When the measurement of the of the strain gage 402 is below a threshold the slot wedge 400 is determined to be loose and the generator may be shut down in order to retighten the slot wedge 400.

When a plurality of strain gages 402 are arranged on the slot wedge 400 it is possible to base the determination of the loose slot wedge 400 based on one or more of the strain gages 402 being below a threshold. In one embodiment, the determination of the loose slot wedge 400 occurs when each of the strain gages is below the threshold.

The temperature compensation strain gage 410 may be used to adjust the measurement of the strain gage 402. By mounting the temperature compensation strain gage 410 on a damper 408, the bending of the slot wedge 400 due to loosening of the slot wedge 400 is reduced and the measured bending relates to a bending due to the effects of temperature. The measurement of the stain strain gage 402 may be adjusted to compensate for the temperature.

By being able to monitor the strain on the slot wedge 400 during operation of the generator 100 the generator 100 may more accurately determine when a retightening needs to occur. Thereby potentially reducing damage to the winding 306 due to a loosening of the slot wedge 400 prior to a scheduled inspection. Furthermore, the time to rewedge could be increased which keeps the generator 100 running for longer periods of time.

While aspects described and illustrated above are in terms of an electrical generator, these aspect may also be applied to large electric motors where the conductors are in a slot of the stator.

Although an exemplary embodiment of the present disclosure has been described in detail, those skilled in the art will understand that various changes, substitutions, variations, and improvements disclosed herein may be made without departing from the spirit and scope of the disclosure in its broadest form.

None of the description in the present application should be read as implying that any particular element, step, act, or function is an essential element, which must be included in the claim scope: the scope of patented subject matter is defined only by the allowed claims. Moreover, none of these claims are intended to invoke a means plus function claim construction unless the exact words "means for" are followed by a participle.

What is claimed is:

1. A slot wedge arrangement comprising:
   a slot wedge having a surface; and
   a strain gauge attached on the surface, the strain gauge comprises a sensor and a lead, the sensor is connected to the lead;
   a damper attached to the slot wedge; and
   a temperature control strain gauge attached to the damper.

2. The slot wedge arrangement of claim 1, wherein the strain gauge is a fiber optic strain gauge stain gage.

3. A generator comprising
   a stator comprising a slot and a housing;
   a plurality of windings arranged in the slot and secured by the slot wedge arrangement according to claim 1
   a connector attached to the lead of the strain gauge, wherein the connector is arranged outside the housing.

4. The generator of claim 3, comprising a pressure seal in the housing; and
   wherein the lead exits the housing via the pressure seal.

5. A method of determining the strain on a slot wedge of the generator of claim 3 during operation, comprising:
   receiving a strain measurement from the strain gauge;
   receiving a temperature measurement from the temperature compensation strain gauge;
   adjusting the strain measurement by the temperature measurement; and
   comparing the adjusted strain measurement to a threshold, wherein the generator is taken offline in result to the adjusted strain measurement is below a threshold.

6. A method according to claim 5, wherein the strain measurement is received from each of the strain gauges and adjusted by the temperature measurement, and each of the adjusted strain measurements is compared to the threshold,
   wherein the generator is taken offline if at least one of the adjusted strain measurements exceeds the threshold, or wherein the generator is taken offline if each of the adjusted strain measurements exceeds the threshold.

7. A method of claim 6, wherein the generator is taken offline if each of the adjusted strain measurements exceeds the threshold.

8. The method of claim 7, wherein the slot wedge is retightened.

9. The method of claim 6, wherein the slot wedge is retightened.

10. The method of claim 5, wherein the slot wedge is retightened.

* * * * *